United States Patent
Baumann et al.

(10) Patent No.: US 6,926,126 B2
(45) Date of Patent: Aug. 9, 2005

(54) DISC BRAKE

(75) Inventors: Dietmar Baumann, Hemmingen (DE);
Herbert Vollert, Vaihingen/Enz (DE);
Hanniel Schmidt, Budapest (RO);
Frieder Keller, Ubstadt-Weiher (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/467,327

(22) PCT Filed: Jan. 19, 2002

(86) PCT No.: PCT/DE02/00162
§ 371 (c)(1),
(2), (4) Date: Jan. 26, 2004

(87) PCT Pub. No.: WO02/063177
PCT Pub. Date: Aug. 15, 2002

(65) Prior Publication Data
US 2004/0112693 A1 Jun. 17, 2004

(30) Foreign Application Priority Data
Feb. 7, 2001 (DE) .......................... 101 05 540

(51) Int. Cl.⁷ .............................................. F16D 65/36
(52) U.S. Cl. ........................... 188/156; 188/74; 188/162
(58) Field of Search .......................... 188/74, 156, 162, 188/72.2, 75, 152, 346, 362, 363, 364, 365, 366, 367, 368, 370

(56) References Cited

U.S. PATENT DOCUMENTS 3,261,432 A * 7/1966 Yves Tournier ......... 188/140 R
3,277,982 A * 10/1966 Kimberlan .................. 188/346
3,502,181 A * 3/1970 Lepelletier .................. 188/345
5,036,960 A * 8/1991 Schenk et al. ............... 188/346

FOREIGN PATENT DOCUMENTS

| DE | 3441128 | * | 5/1986 |
| EP | 0 208 098 A | | 1/1987 |
| FR | 2146160 | * | 3/1973 |
| FR | 2648098 | * | 12/1990 |

* cited by examiner

*Primary Examiner*—Chris Schwartz
(74) *Attorney, Agent, or Firm*—Ronald E. Greigg

(57) ABSTRACT

The invention relates to an electromechanical disk brake (10). To attain brake boosting, the invention proposes embodying the disk brake (10) with a multiple brake cylinder (24), which is displaceable in a secant direction of a brake disk (20), and which has both a friction brake lining piston (22), which is displaceable transversely to the brake disk (20), and two brake booster pistons (26), disposed facing one another, which are displaceable parallel to the brake disk (20), and which are braced on fixed abutments (36), for instance on an inside of a brake caliper (12) of the disk brake (10). For actuation of the disk brake (10), the multiple brake cylinder (24) is displaced in the direction of rotation (46) of the brake disk (20), and as a result, the brake booster piston (26) that is at the front in the displacement direction moves into the brake cylinder (26) and, via the friction brake lining piston (22), presses the friction brake lining (18) against the brake disk (20). A force of friction exerted on the friction brake lining (18) by the rotating brake disk (20) presses the multiple brake cylinder (24) in its displacement direction as well and as a result boosts a pressure exerted on the friction brake lining piston (22) by the brake booster piston (26), thus in turn increasing the braking force.

20 Claims, 1 Drawing Sheet

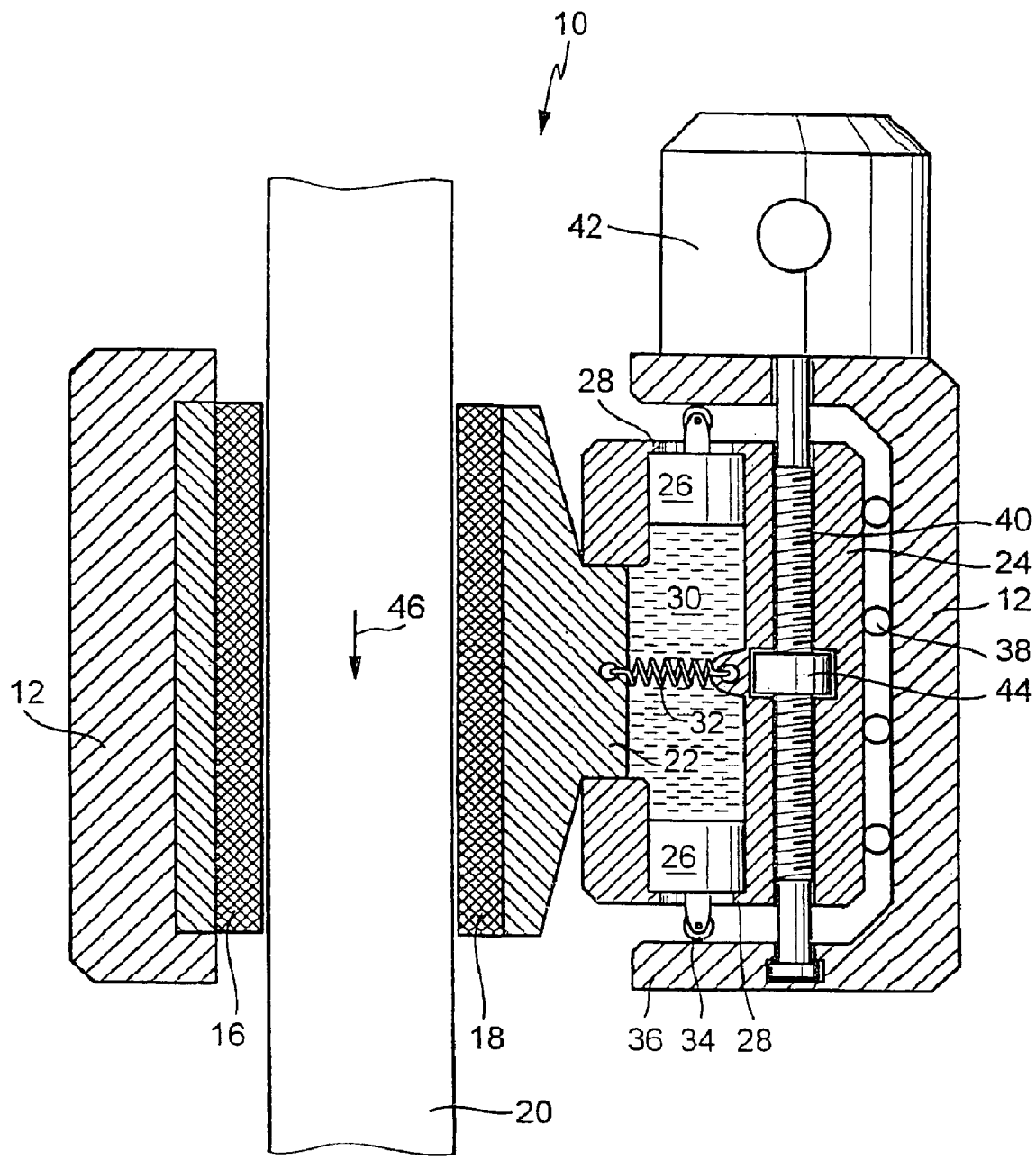

0# DISC BRAKE

CROSS-REFERENCE TO RELATED APPLICATIONS

This application is a 35 USC 371 application of PCT/DE 02/00162 filed on Jan. 19, 2002.

BACKGROUND OF THE INVENTION

1. Field of the Invention

The invention relates to an improved disk brake having a multiple brake cylinder disposed laterally of the brake disc and movable in a secant direction of the disc.

2. Description of the Prior Art

Conventional disk brakes, in any case those typically used at present, are actuated hydraulically. They have a brake caliper, in which two friction brake linings rest, one on each side of a brake disk disposed between them. A friction brake lining piston that can be actuated hydraulically is received in the brake caliper transversely to the brake disk, and with it a friction brake lining can be pressed against the brake disk. The other friction brake lining can likewise be pressable by a friction brake lining piston against the other side of the brake disk (so-called fixed caliper). It is also known for the brake caliper to be embodied as a so-called floating caliper that is displaceable transversely to the brake disk. Pressing one friction brake lining against one side of the brake disk displaces the brake caliper transversely to the brake disk and presses the other friction brake lining against the other side of the brake disk. As a result of the pressing against the two friction brake linings, the brake disk is braked.

A number of electromechanicaily actuated disk brakes are also known by now, in which a friction brake lining can be pressed against a brake disk by means of an electric motor via a rotation/translation conversion gear. One example of such an electromechanically actuated disk brake is disclosed in International Patent WO 96/03301. The known disk brake has an electric motor, with which, via a spindle drive as the rotation/translation conversion gear, a friction brake lining can be pressed against a brake disk. The electric motor and the spindle drive form an actuating device of the known disk brake and are accommodated in a brake caliper embodied as a floating caliper. The known electromechanically actuated disk brakes have the general disadvantage that in comparison with hydraulically actuated disk brakes that they are large and heavy, because of the electric motor and the rotation/translation conversion gear. Because of their size, the known electromechanically actuated disk brakes are hard to accommodate inside a rim of a vehicle wheel, where disk brakes are usually disposed. The high weight of the electromechanically actuated disk brakes impairs vehicle performance and contact with the road, especially because the disk brake is among what are known as unsprung masses, which for the sake of good vehicle performance and good road contact should be kept low. Another disadvantage of electromechanically actuated disk brakes is high power consumption of their electric motor with an attendant heavy load on an on-board electrical system of a vehicle equipped with the brake.

The known hydraulically and electromechanically actuated disk brakes share the disadvantage that they have no brake force boosting comparable to the brake force boosting of the kind known with the so-called leading-shoe in a drum brake. The leading shoe of a drum brake, on being pressed against the brake drum, is additionally pressed against the brake drum by the rotating brake drum itself, and as a result the braking force is increased.

SUMMARY OF THE INVENTION

The disk brake of the invention has a multiple brake cylinder, which is disposed laterally of the brake disk and is movable in a secant direction of the brake disk. The brake cylinder can be guided displaceably, for instance by means of a sliding guide or the like, in the secant direction of the brake disk. It is equally possible for the brake cylinder to be supported rotatably about an imaginary axis of rotation that is offset radially inward or outward from the brake cylinder. By means of this kind of rotational support, the brake cylinder is movable along a circular-arc path, which at least at one or more points extends in a secant direction of the brake disk and is intended to be seen in terms of the invention as a sufficient approach to the secant direction. In other words, the brake cylinder need not be guided movably along an imaginary straight line.

Besides the friction brake lining piston, the brake cylinder of the disk brake of the invention has a brake booster piston, which is received displaceably in the brake cylinder in a direction of motion of the brake cylinder. The brake booster piston is braced on a fixed abutment, for instance on a brake caliper of the disk brake. The friction brake lining piston and the brake booster piston communicate with one another, for instance by means of a hydraulic fluid of constant volume enclosed in the brake cylinder.

For actuating the disk brake of the invention, its brake cylinder is displaced in a direction of rotation of the brake disk and in the direction of the fixed abutment of the brake booster piston. The brake booster piston braced on the abutment is displaced by the abutment into the brake cylinder that is moved toward the abutment. The brake booster piston displaced into the inside of the brake cylinder positively displaces hydraulic fluid and as a result displaces the friction brake lining piston out of the brake cylinder. The friction brake lining piston is displaced in the direction of the brake disk and presses the friction brake lining, disposed between it and the brake disk, against the brake disk, as a result of which the friction brake lining brakes the brake disk.

The rotating brake disk exerts a frictional force in the secant direction on the friction brake lining pressed against it, which transmits the frictional force to the brake cylinder via the friction brake lining piston. The frictional force exerted by the rotating brake disk on the friction brake lining pressed against it thus displaces the brake cylinder in the direction of the fixed abutment, which as a result presses the brake booster piston more strongly into the brake cylinder. The pressure force exerted on the friction brake lining piston by the brake booster piston and thus the contact-pressure force of the friction brake lining against the brake disk are increased; that is, the braking force of the disk brake of the invention is increased. The disk brake of the invention thus has brake force boosting; the braking force generated by pressing the friction brake lining against the brake disk is brought to bear only partially by means of an external actuating force, with which the multiple brake cylinder is moved in the direction of the fixed abutment; for the remainder, the braking force is generated as described, by the frictional force exerted by the rotating brake disk against the friction brake lining pressed against it. Because of the brake force boosting of the disk brake of the invention, an actuating force to be brought to bear to actuate it is reduced; furthermore, the disk brake of the invention, because of its brake force boosting, can be embodied in a smaller, more lightweight fashion. Another advantage of the disk brake of the invention is an attainable enhancement of its dynamics, that is, a shortening of the tightening and release time, because of the reduced actuating force and the possibility of reducing its weight.

In a preferred feature of the invention the brake cylinder has two brake booster pistons, which are received displaceably in opposite directions in the brake cylinder, and which are braced on abutments that face away from one another. The two brake booster pistons can be disposed coaxially in the brake cylinder, or they can be laterally offset, for instance being side by side. There is a limit to the expulsion path of the two brake booster pistons, which cannot be displaced out of the brake cylinder beyond a basic position when the disk brake is not actuated. The actuation of the disk brake is effected as described above by motion of the brake cylinder in the direction of rotation of the brake disk in the direction of the one abutment. The second brake booster piston is not active upon braking; because of its expulsion path limiter, it remains in its basic position and limits the volume in the brake cylinder. If for instance when the vehicle is driving in reverse the direction of rotation of the brake disk is reversed, then to actuate the disk brake, the brake cylinder is displaced in the direction of the abutment of the second brake booster piston. This displacement direction, because of the reversed direction of rotation of the brake disk, is its direction of rotation again. The braking with the reversed direction of rotation of the brake disk is effected in the same way as described above with the second brake booster piston; in that case, the first brake booster piston is not active but instead is at its expulsion path limiter. Because of the provision of two brake booster pistons that are displaceable in opposite directions, the disk brake of the invention has brake boosting for both directions of rotation of the brake disk; the disk brake is not dependent on the direction of rotation.

The brake boosting can be selected variably, by the selection of various-sized piston faces of the brake booster pistons for the two directions of rotation of the brake disk. By means of piston faces of equal size for the two brake booster pistons, the braking force boosting of the disk brake of the invention is the same for both directions of rotation of the brake disk.

By selecting piston faces of the brake booster piston and of the friction brake lining piston that are of different sizes or of equal size, the magnitude of the braking force boosting can be selected. According to one embodiment the piston face of the brake booster piston is smaller than the piston face of the friction brake lining piston, as a result of which the braking force boosting is increased.

The disk brake of the invention is intended in particular for electromechanical actuation by means of an electric motor.

Because of the brake force boosting, a small, lightweight electric motor with only slight movable mass can be selected. A rotation/translation conversion gear of lightweight construction can also be embodied. The braking force boosting of the disk brake of the invention makes it possible to reduce the moving masses involved in its actuation, and as a result the disk brake has increased dynamics. Moreover, a comparatively low-power electric motor that has reduced power consumption suffices and makes an on-board electrical system of a vehicle equipped with the disk brake of the invention smaller.

Instead of a hydraulic fluid, one embodiment provides an elastic mass; which transmits the motion of the brake booster piston to the friction brake lining piston. An elastic mass has the advantage that sealing of the pistons can be omitted, a loss of hydraulic fluid need not be feared.

BRIEF DESCRIPTION OF THE DRAWINGS

The invention is described in further detail below in terms of an exemplary embodiment, with reference to the single drawing FIGURE which schematically shows a disk brake of the invention in section, looking radially onto a brake disk from outside.

DESCRIPTION OF THE PREFERRED EMBODIMENT

The disk brake 10 of the invention; shown in the drawing; has a brake caliper 12; in which two friction brake linings 16, 18 are located, one on each side; of a brake disk 20. The brake caliper 12 is embodied as a so-called floating caliper; it is displaceable transversely to the brake disk 20. The friction brake lining 16 shown on the left in the drawing is received fixedly in the brake caliper 12, while the friction brake lining 18 shown on the right in the drawing is movable. Because of the sectional view, the brake caliper 12 appears to be in two parts. In fact, however, the brake caliper is in one piece; it fits over the brake disk 20 on the circumference thereof.

The movable friction brake lining 18 has a friction brake lining piston 22, which is received in a multiple brake cylinder 24 displaceably transversely to the brake disk 20. Besides the friction brake lining piston 22, the multiple brake cylinder 24 also has two brake booster pistons 26, which are disposed coaxially, facing one another, in the brake cylinder 24. The two brake booster pistons 26 are received displaceably in the brake cylinder transversely to the friction brake lining piston 22 and thus parallel to the brake disk 20. An expulsion path limiter 28 in the form of an annular collar, protruding radially inward, of the brake cylinder 24 on outer sides of the brake booster pistons 26 prevents the brake booster pistons 26 from being displaced outward, past a basic position, out of the brake cylinder 24. The brake booster pistons 26 are shown in the drawing in their basic position, with the disk brake 10 released. The brake booster pistons 26 communicate with the friction brake lining piston 22 by means of a hydraulic fluid (brake fluid) 30. The hydraulic fluid 30 is enclosed with a limited, fixed volume in the multiple brake cylinder 24 between the pistons 22, 26. The brake booster pistons 26 have a smaller diameter than the friction brake lining piston 22 and thus have smaller piston faces. As a result, a force boost takes place from the brake booster pistons 26 to the friction brake lining piston 22.

The friction brake lining piston 22 has a restoring spring 32. In the exemplary embodiment of the invention shown and described, this spring is embodied as a helical tension spring; it is disposed in the brake cylinder 24 and is suspended by one end from the friction brake lining piston 22 and by another end from the brake cylinder 24. The restoring spring 32 lifts the friction brake lining 18 away from the brake disk 20 when the disk brake 10 is not actuated.

On their outsides, the brake booster pistons 26 have rollers 34, with which they are braced on an inside of the brake caliper 12. The brake caliper 12 forms a fixed abutment 36 for the brake booster pistons 26, and the abutments 36 of the two brake booster pistons 26 are oriented toward one another, thus facing in opposite directions. The two brake booster pistons 26 are displaceable toward one another and thus in opposite directions in the brake cylinder 24.

The multiple brake cylinder 24 is located on a side of the movable friction brake lining 18 remote from the brake disk 20 and thus laterally of the brake disk 20. The brake cylinder 24 is displaceable in the same direction as the brake booster pistons 26 and thus parallel to the brake disk 20 and in a secant direction to the brake disk 20 in the brake caliper 12. On a back side, remote from the brake disk 20, the brake cylinder 24 is braced via rollers 38 against an inside of the brake caliper 12.

The brake cylinder 24 is penetrated by a spindle 40, which is driven to rotate by an electric motor 42 flanged to the outside of the brake caliper 12. The spindle 40 is disposed parallel to the brake disk 20 and in the displacement direction of the brake cylinder 24. A nut 44 is mounted on the spindle 40, and by way of it the actuating force can be transmitted axially to the brake cylinder 24. The nut 44 rests, secured against relative rotation, in a recess of the brake cylinder 24. The spindle 40 and the nut 44 form a spindle drive mechanism 40, 44, by way of which, by means of the electric motor 42, the brake cylinder 24 is displaceable parallel and in a secant direction to the brake disk 20.

To explain the function of the disk brake 10 of the invention, it is assumed below that the brake disk 20 is rotating in the direction of the arrow 46, that is, downward in terms of the drawing. For actuating the disk brake 10, the multiple brake cylinder 24 is displaced in the direction of rotation of the brake disk 20 as a result of supplying current to its electric motor 42 via the spindle drive mechanism 40, 44. In the assumed direction of rotation of the brake disk 20 in the direction of the arrow 46, the brake cylinder 24 is accordingly displaced downward in the drawing. The front brake booster piston 26, in terms of the displacement direction of the brake cylinder 24, is braced on its abutment 36 and is displaced into the brake cylinder 24 by the displacement of the brake cylinder and positively displaces hydraulic fluid. The other brake booster piston 26 is prevented from being displaced out of the brake cylinder 24 by its expulsion path limiter 28 and as a consequence does not move within the brake cylinder 24. As a result of its displacement, the front brake booster piston 26 in terms of the displacement direction of the brake cylinder 24 positively displaces hydraulic fluid in the direction of the friction brake lining piston 22, which as a result is displaced out of the brake cylinder 24, in the direction of the brake disk 20. In the process, the friction brake lining piston 22 presses the movable friction brake lining 18 against the side, toward it, of the brake disk 20. In a manner known per se, the movable friction brake lining 18 contacting the brake disk 20 displaces the brake caliper 12, embodied as a floating caliper, transversely to the brake disk 20, and the brake caliper 12 presses the fixed friction brake lining 16 against the other side of the brake disk 20. The brake disk 20 is braked.

The rotating brake disk 20 exerts a frictional force on the movable friction brake lining 18 which is pressed against it and is oriented in the direction of rotation, or secant direction, of the brake disk 20. The frictional force exerted on the movable friction brake lining 18 by the rotating brake disk 20 is oriented parallel to the displacement direction of the brake cylinder 24. The frictional force is transmitted from the movable friction brake lining 18 to the brake cylinder 24 via the friction brake lining piston 22 and presses the brake cylinder 24, in addition to the force exerted on it by the spindle drive mechanism 40, 44, in the direction of the abutment 36, which is located ahead of the brake cylinder 24 in terms of the direction of rotation of the brake disk 20 and the displacement direction of the brake cylinder 24. As a result, the abutment 36 presses the front brake booster piston 26, in terms of the displacement direction of the brake cylinder 24, more strongly into the brake cylinder 24, and as a result a pressure of the hydraulic fluid 30 increases, which via the friction brake lining piston 22 increases the contact-pressure force of the friction brake lining 18 against the brake disk 20. The contact-pressure force of the friction brake lining 18 against the brake disk 20 and thus a braking force of the disk brake 10 of the invention is thus increased by the frictional force exerted by the rotating brake disk 20 on the movable friction brake lining 18 pressed against it. The contact-pressure force of the friction brake lining 18 against the brake disk 20 is consequently brought to bear only partly by the electric motor 42 via the spindle drive mechanism 40, 44, and for the rest is brought to bear by the frictional force exerted by the rotating brake disk 20 on the movable friction brake lining 18 pressed against; the disk brake 10 of the invention consequently has a braking force boost. A magnitude of the braking force boosting is depending among other factors on a friction factor between the brake disk 20 and the friction brake lining 18 and on a ratio of the piston faces of the brake booster pistons 26 and the friction brake lining piston 22. The magnitude of the brake boosting can be selected by the choice of piston diameters.

If the brake disk 20 is rotating in the opposite direction (in reverse travel), then for actuation of the disk brake 10, the multiple brake cylinder 24 is displaced in the opposite direction in the same manner described above, that is, back in the direction of rotation of the brake disk 20, via the spindle drive mechanism 40, 44 as a result of a supply of current to the electric motor 42. The pressing against the friction brake lining 18 and the brake boosting are accomplished in the same way as described above; however, it is the other brake booster piston 26 that is active and that is now located at the front in terms of the displacement direction of the brake cylinder 24. As a result, the brake boosting is independent of a direction of rotation of the brake disk 20. By means of different diameters of the two brake booster pistons 26, a variously pronounced brake boosting can be selected for the two directions of rotation of the brake disk 20, that is, a variously strong brake boosting for travelling forward and for travelling in reverse.

Instead of the hydraulic fluid 30, the multiple brake cylinder 24 of the disk brake 10 of the invention can contain an elastic mass, which transmits a force, exerted by one of the two brake booster pistons 26 upon displacement of the brake cylinder 24, to the friction brake lining piston 22. Examples of such elastic masses are silicone, elastomer, or EPDM (ethylene propylene diene elastomer).

The foregoing relates to preferred exemplary embodiments of the invention, it being understood that other variants and embodiments thereof are possible within the spirit and scope of the invention, the latter being defined by the appended claims.

What is claimed is:

1. A disk brake assembly including a brake disc (20) and a friction brake lining (18) which can be pressed against the brake disk (20), the disk brake assembly (10) comprising
 a multiple brake cylinder (24) disposed laterally of the brake disk (20) movable in a secant direction of the brake disk (20),
 a friction brake lining piston (22) displaceably received in the multiple brake cylinder (24) transversely to the brake disk (20), the piston (22) being movable to press the friction brake lining (18) against the brake disk (20),
 a brake booster piston (26) received displaceably in the brake cylinder (24) in the direction of motion of the multiple brake cylinder (24) and braced against a fixed abutment (36), a closed volume between the friction brake lining piston (22) and the brake booster piston (26) and communicating therewith, a pressure transmitting medium filling the closed volume between the lining piston (22) and the booster piston (26), the multiple brake cylinder (24) being displaced along the secant direction, generally in the direction of rotation of the brake disk (20), which displacement is toward the fixed abutment (36) and causes the friction brake lining (18) to be applied against the brake disk (20), further comprising means (42) for moving the multiple brake cylinder (24) in the secant direction of the brake disk (20).

2. The disk brake of claim 1, wherein the multiple brake cylinder (24) comprises two brake booster pistons (26) received displaceably in opposite directions in the brake cylinder (24) and braced against fixed abutments (36); and wherein the two brake booster pistons (26) each have an expulsion path limiter (28).

3. The disk brake of claim 2, wherein the brake booster pistons (26) have piston faces of equal size.

4. The disk brake of claim 2, wherein one of the brake booster pistons (26) has a piston face of a different size from the friction brake lining piston (22).

5. The disk brake of claim 2, wherein the piston face of one of the brake booster pistons (26) is smaller than the piston face of the friction brake lining piston (22).

6. The disk brake of claim 1, wherein the brake booster piston (26) has a piston face of a different size from the friction brake lining piston (22).

7. The disk brake of claim 6, wherein the piston face of the brake booster piston (26) is smaller than the piston face of the friction brake lining piston (22).

8. The disk brake of claim 1, further comprising a restoring spring (32) for the friction brake lining piston (22).

9. The disk brake of claim 1, wherein the pressure transmitting medium is an elastic mass.

10. The disc brake of claim 1, wherein the pressure transmitting medium is a hydraulic fluid.

11. The disc brake of claim 1, wherein the pressure transmitting medium is a hydraulic fluid.

12. A disk brake assembly including a brake disc (20) and a friction brake lining (18) which can be pressed against the brake disk (20), the disk brake assembly (10) comprising a multiple brake cylinder (24) disposed laterally of the brake disk (20) movable in a secant direction of the brake disk (20), a friction brake lining piston (22) displaceably received in the multiple brake cylinder (24) transversely to the brake disk (20), the piston (22) being movable to press the friction brake lining (18) against the brake disk (20), a brake booster piston (26) received displaceably in the brake cylinder (24) in the direction of motion of the multiple brake cylinder (24) and braced against a fixed abutment (36), a closed volume between the friction brake lining piston (22) and the brake booster piston (26) and communicating therewith, a pressure transmitting medium filling the closed volume between the lining piston (22) and the booster piston (26), the multiple brake cylinder (24) being displaced along the secant direction, generally in the direction of rotation of the brake disk (20), which displacement is toward the fixed abutment (36) and causes the friction brake lining (18) to be applied against the brake disk (20), further comprising an electric motor (42) for moving the multiple brake cylinder (24) in the secant direction of the brake disk (20).

13. The disk brake of claim 12, wherein the multiple brake cylinder (24) comprises two brake booster pistons (26) received displaceably in opposite directions in the brake cylinder (24) and braced against fixed abutments (36); and wherein the two brake booster pistons (26) each have an expulsion path limiter (28).

14. The disk brake of claim 13, wherein the brake booster pistons (26) have piston faces of equal size.

15. The disk brake of claim 13, wherein one of the brake booster pistons (26) has a piston face of a different size from the friction brake lining piston (22).

16. The disk brake of claim 13, wherein the piston face of one of the brake booster pistons (26) is smaller than the piston face of the friction brake lining piston (22).

17. The disk brake of claim 12, wherein the brake booster piston (26) has a piston face of a different size from the friction brake lining piston (22).

18. The disk brake of claim 17, wherein the piston face of the brake booster piston (26) is smaller than the piston face of the friction brake lining piston (22).

19. The disk brake of claim 12, further comprising a restoring spring (32) for the friction brake lining piston (22).

20. The disk brake of claim 12, wherein the pressure transmitting medium is an elastic mass.

* * * * *